Aug. 30, 1960 J. C. LANG 2,950,602

EXPANSION DEVICE

Filed Nov. 20, 1956 3 Sheets-Sheet 1

INVENTOR.
Joseph C. Lang.
BY
William J. Ruano
HIS ATTORNEY.

EXPANSION DEVICE

Filed Nov. 20, 1956

3 Sheets-Sheet 2

INVENTOR.
Joseph C. Lang.
BY
William J. Ruano
HIS ATTORNEY

Aug. 30, 1960 J. C. LANG 2,950,602

EXPANSION DEVICE

Filed Nov. 20, 1956 3 Sheets-Sheet 3

INVENTOR.
Joseph C. Lang.
BY
William J. Ruano
HIS ATTORNEY.

United States Patent Office 2,950,602

Patented Aug. 30, 1960

2,950,602

EXPANSION DEVICE

Joseph C. Lang, 3326 Middletown Road, Pittsburgh 4, Pa.

Filed Nov. 20, 1956, Ser. No. 623,430

3 Claims. (Cl. 61—45)

This invention relates to expansion devices and, more particularly, to improvements in expansion bolts which are adapted to be expanded into gripping relationship with the wall of a hole formed in a structure to which the bolt is to be anchored.

The present invention, although having a wide variety of applications, is particularly suited for use in mines as a roof suspension bolt, popularly called mine roof bolts, for supporting the roof of a mine by securely holding together the layers or strata of rock or other material forming the roof so as to form, in effect, a thick beam or single unit and thus eliminate the danger of roof fall.

Mine roof bolts have been introduced recently and have taken the place of timbering of mines for roof support. They are not only safer and more economical but are more efficient than timbering and provide substantially greater head room and lateral clearance as well as better ventilation, since there is no obstruction to air flow. These bolts are anchored by expansion devices at the top or rear of the holes driven into the roof strata. The bolt is wrenched tightly against a steel roof bearing plate and the stratified or fractured rock is thereby compressed and bound together into a self-supporting laminated beam that is so strong that it supports material above and around the excavation.

A common type of roof bolt is one having a split top end and a wedge which spreads the split end when the wedge is pushed against the top of a hole drilled in the mine roof. This type has the outstanding disadvantage of requiring a hole of precise length, or requiring the use of extensions.

Another common type of roof bolt is one embodying an expansion type shell which is expanded by turning of the bolt, which effects entry of a supported wedge in the split top end and spread of serrated segments of the shell against the roof hole. While the hole need not be made of precise depth, but is made deeper than the bolt length, such roof bolt has the same outstanding disadvantage as all wedge type roof bolts, namely, the shells are not retrievable or recoverable after anchorage, therefore cannot be used more than once. This constitutes a great and unnecesasry waste and costly item of expense. Not only are such units not recoverable but they are not entirely reliable in operation since wedging forces act in a downward and outward direction, therefore the device is anchored to the roof hole in one localized spot which may be a soft spot in the roof strata. In other words, the segmental portions of the shell are outwardly expanded angularly and the pressure point is at one spot where the segments first contact the roof hole rather than along the entire length of the segments. A still further disadvantage is that the entire bolt assembly is held anchored solely by the threads of the nut, therefore upon accidental turning of the nut from vibration or the like, there remains not even the single anchoring point described above. And since the anchoring forces act downwardly at an angle, there is no possibility of forming a horizontal beam under compression by using a plurality of anchors at the same height. An additional disadvantage is that wedge type units are of special construction, requiring casting of oddly shaped parts, which increases production costs.

An object of the present invention is to provide a novel expansion device which is relatively simple and inexpensive in construction, but which provides a much stronger and more reliable anchorage than heretofore obtainable with well known types of expansion devices and which is useful in a wide variety of applications, such as in masonry construction, bridges, highways, tunnels, mines, etc.

Another object of the present invention is to provide a novel expansion device which is particularly useful as a mine roof bolt and which is devoid of the above named disadvantages of known types of mine roof bolts.

A more specific object of my invention is to provide a mine roof bolt including expansible elements which extend along a substantial portion of the length of the bolt, and which provide anchorage along such length and on the entire circumferential area of the surrounding roof hole, therefore providing a much stronger anchorage than heretofore obtainable and assuring secure anchorage irrespective of the occurrence of soft spots at some of the points along such length.

A still further object of certain forms of the present invention is to provide a reliable mine roof bolt that not only insures firm anchorage but which can be retrieved or recovered and used elsewhere, over and over again, therefore reducing overall mine operating costs.

Another object is to provide an expansion unit wherein the expansion forces are at right angles to the bolt, instead of being inclined at an angle thereto, thereby enabling the placement of the upper or supporting stratum of rock or sandstone under compression so that it will act as a strong supporting beam for underlying strata to prevent sagging and possible cave-in of such underlying strata and consequent accidents.

A still further object is to provide an expansion device of the shell type which can be radially expanded to a greater extent than most known types of units, therefore not requiring close fit into the hole formed in the mass to which anchorage is desired.

Another object is to provide a multiple expansion bolt having a plurality of longitudinally spaced expansion devices for anchorage to separate strata of a mine roof, for example.

A more specific object is to provide a mine roof expansion bolt surrounded by a plurality of split rings of different diameter, which rings, when compressed together, will effect a wedging action, the larger diameter rings expanding in diameter and tightly gripping the roof hole, the smaller diameter rings contracting and gripping the bolt, thereby eliminating all the strain or pressure otherwise taken by the threads in the nut as in well known, shell type devices, therefore insuring a very tight grip at a multiplicity of points on the walls of the hole in the mine roof.

Another object of the present invention is to provide an expansion device for general application as an expansion bolt, anchor, clutch or for any other application involving gripping of a radially expansible member with the walls of a hole formed in an outer member.

Other objects and advantages of the present invention will become more apparent from a study of the following description of typical modifications thereof, taken with the accompanying drawings wherein.

Figure 9:
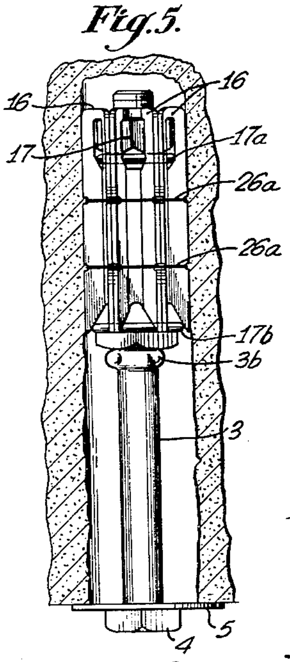
Figure 9 is a vertical cross-sectional view of a still further modification embodying punch pressed segments and Figure 9*a* is a top view thereof.
Figures 9B, 10A, 10B, 11, 12, 13, 14, 15, 16:
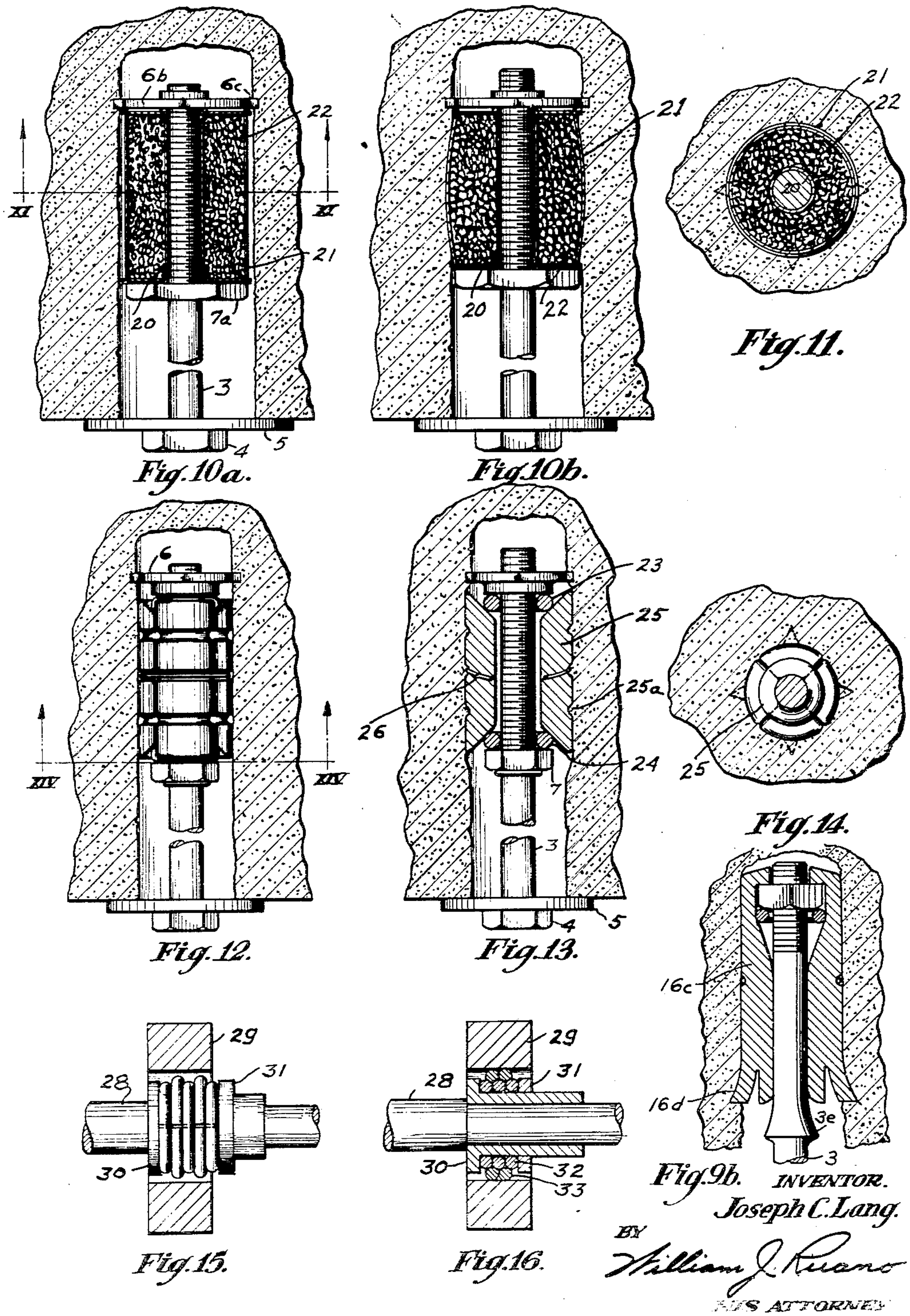

Figure 9*b* is vertical cross-sectional view of a slight modification of the punch pressed elements of Figure 9.

Figure 10*a* is a vertical cross-sectional view of a further modification in which the expansion means includes a casing filled with aggregates, wherein the casing is shown in the normal position before expansion; Figure 10*b* is a view similar to Figure 10*a* except that it shows the casing in the expanded position; and Figure 11 is a cross-sectional view taken along line XI—XI of Figure 10*a*.

Figure 12 shows a still further modification of the expansion device wherein the expansible elements are in the form of punch pressed, radial segments; Figure 13 is a vertical cross-sectional view of the device shown in Figure 12, wherein the segments are shown in the expanded position; and Figure 14 is a cross-sectional view taken along line XIV—XIV of Figure 12.

Figure 15 is an elevational view, partly in cross-section, of the expansion device used as a clutch for coupling two coaxial members.

Figure 16 is a vertical cross-sectional view of the clutch shown in Figure 15.

Figure 3:
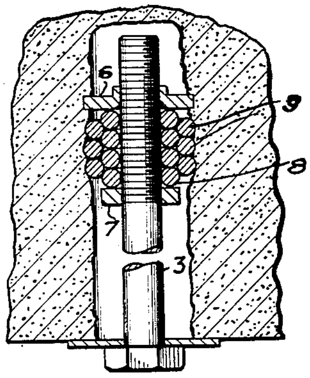
Figure 3 is a view similar to Figure 2 except that the expansible split rings and the nuts are shown in vertical cross-section.
Figure 17:
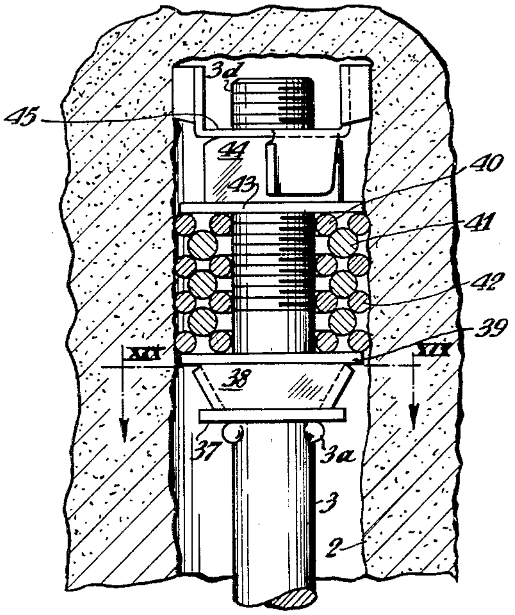
Figure 18:
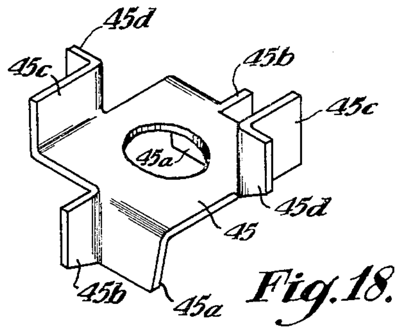
Figure 19:
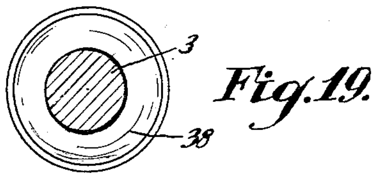

Figure 17 is a vertical cross-sectional view similar to Figure 3 except that a novel nut lock is used; Figure 18 is a perspective view of the nut lock of Figure 17 and Figure 19 is a view taken along line XIX—XIX of Figure 17.

Figure 20:
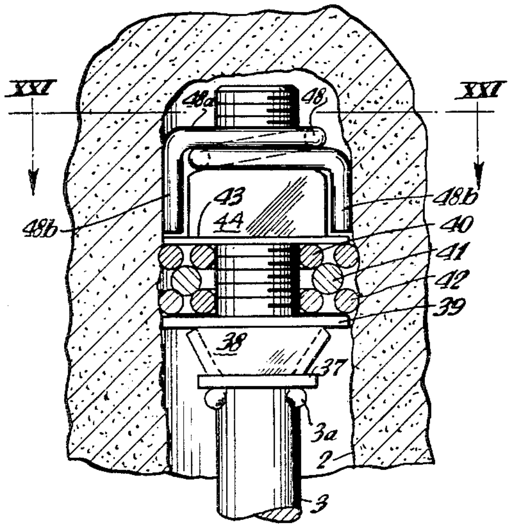
Figure 21:
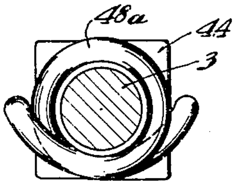

Figure 20 is a section of another modified form of nut lock and Figure 21 is a top view thereof.

Referring more particularly to Figures 1 to 5, inclusive, of the drawing, numeral 1 denotes a fragmentary portion of a masonry construction or mine roof rock strata and numeral 2 denotes a cylindrical hole bored therein. A bolt 3 is provided, which is of shorter length than the hole, and which has a bolt head 4 and a washer 5 which may be either separate or integral with the bolt head. Onto the threads of bolt 3 is screw threaded a nut 6 having a plurality of pointed projections **6*a* which are anchored into the hole wall to prevent the nut from turning. Onto an intermediate portion of the bolt 3 a nut 7** is screw-threadedly engaged.

An important feature of the present invention resides in the construction of the expansion unit which comprises a plurality of split rings comprising alternate inner split rings 8 of relatively small diameter and alternate outer split rings 9 of relatively large diameter. The rings are of spring steel and may be made of any desired cross-section, a round cross section being shown by way of example.

Figure 1:
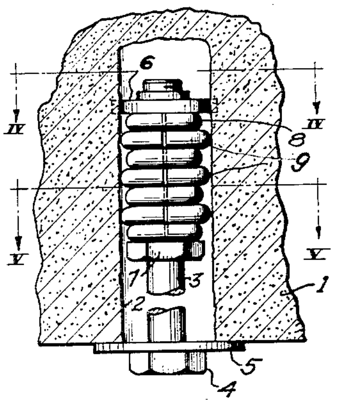
Figure 1 is a side elevational view of an expansion bolt or mine roof bolt embodying the present invention shown in the normal position, that is, before being expanded against the walls of the hole formed in the mine roof or other medium, shown in vertical cross-section.
Figure 2:
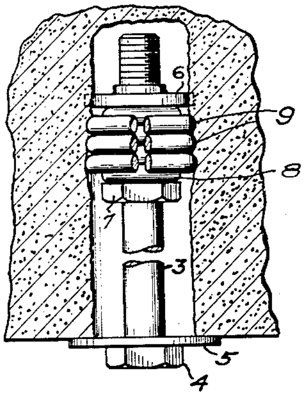
Figure 2 is a view similar to Figure 1 except that it shows the bolt in the expanded position.

In operation, and as more clearly illustrated in Figure 3, the expansion unit is first forced into the hole, during which movement, longitudinal grooves will be formed in the hole wall by projections **6*a* as the unit assumes the position shown in Figure 1. The bolt head is then turned a few turns by any suitable means, such as a compressed air impact wrench or by an electrically driven rotary wrench, and as a result thereof nuts 6 and 7 are moved toward each other, thereby compressing split rings 8 and 9 together. As the split rings are compressed together the outer rings 9 are spread in diameter by the inner rings 8 which tend to wedge therein, also the inner rings will shrink somewhat in diameter by being wedged within the outer rings so as to eventually grip the shank portion of the bolt. The outer rings will expand sufficiently so as to become tightly embedded in the hole wall 2**, as shown in Figures 2 and 3, and exert a radially outward force throughout the entire length of the rings and thus form a secure anchor along the entire length of the hole wall engaged by the outer rings.

When it is desired to retrieve the expansion bolts, the bolt head 4 is unscrewed, causing nuts 6 and 7 to separate, and in so doing, the rings 8 and 9 are relieved of compressive forces. And since the rings 8 and 9 are of spring steel, they will assume their original shape as shown in Figure 1 so as to enable withdrawal of the expansion bolt unit from the hole without damage thereof so that it may be used elsewhere over and over again. This ability to retrieve the expansion bolt and to do so in a simple manner, constitutes a significant improvement over conventional mine roof bolts which are generally not capable of being retrieved or cannot be retrieved economically.

It will be apparent that although three outer rings and four inner rings are shown, by way of example, the number of rings may be decreased or increased as desired. Moreover, the rings may be made of any suitable size and diameter. I have obtained very satisfactory results by using inner split rings 8 made of 1/4″ diameter spring wire, having inside and outside diameters of 5/8″ and 1 1/8″, respectively, and by using outer split rings 9, also of the same 1/4″ wire, having inside and outside diameters of 7/8″ and 1 3/8″ respectively, there being gaps of 1/16″ in both rings. Of course other diameters of wire and other combinations of inside and outside diameters may be used instead, depending upon the specific application.

Figure 6:
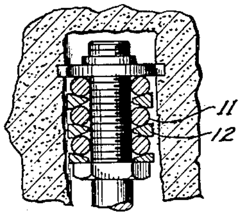
Figure 6 is a fragmentary view, similar to Figure 3, but showing a modified form of expansion ring of wedge shaped cross-section and used alternately with split rings having round cross-sections.

It should be also noted that the inner and outer rings need not be round in cross section and the inner rings may instead be round in cross section and the outer rings, wedge shaped (Fig. 6) so that as the nuts are moved together, compressing the rings, the inner rings will, by longitudinal contraction, spread the diameters of the outer, wedge shaped rings 12 so as to force them against the hole wall. The outer surfaces of the wedge shaped rings 12 may be serrated to improve the anchorage and prevent slippage relative the hole wall. Both the inner and outer rings 11 and 12 respectively may be made wedge shaped, if desired, or may be made of other polygonal shapes.

Figure 7:
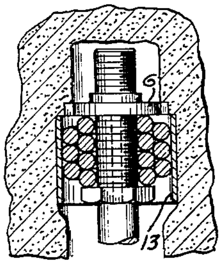
Figure 7 is a fragmentary, vertical cross-sectional view similar to Figure 3 but showing a modification of the expansible means which includes an outer sheath of deformable material.

Figure 7 shows a modification which includes an additional hollow cylindrical sheath 13 of deformable material, such as soft metal, for example lead or copper, which sheath will become expanded by pressure from the outer rings and forced against the hole wall. Such sheath increases the area of frictional contact with the hole wall. The sheath may be perforated or of expanded metal, also it may have a roughened or serrated outer surface, or roughened outer and inner surfaces to further insure against slippage.

One or more additional layers of split rings may encircle rings 9 if greater radial expansion is desired.

Figure 8:
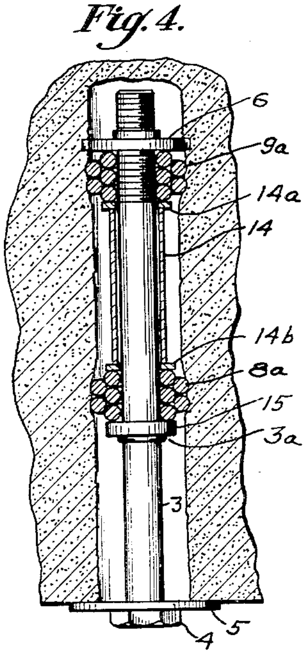
Figure 8 is a vertical cross-sectional view of a further modification of an expansion bolt that is particularly suitable as a mine roof bolt and illustrated in the expanded position.

Figure 8 shows a modification wherein a plurality of expansion units are provided along the length of the roof bolt. Two separate, spaced sets of rings are shown, although it should be noted that three or more spaced sets may be used instead, depending upon the length of hole and the number of layers or strata of rock forming the mine roof. The upper set of rings 9a is spaced from the lower set 8a by means of a hollow cylindrical metal tube 14 having end flanges or collars 14a and 14b which transmit forces between the upper and lower sets of rings. Integral ears or collar 3a may be formed as part of the bolt shank to serve as a stop for spacer 15. The operation of the multiple expansion bolt is substantially as described previously except that both sets are compressed simultaneously to expand their outer split rings as the bolt head is turned.

Figure 9A:
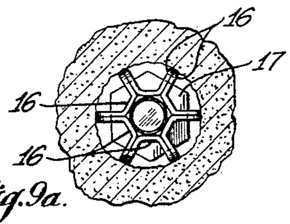

Figs. 9 and 9*a* disclose another modification, wherein a collar or integral protuberance 3b is provided on bolt 3 on which a nut or washer rests which, together with nut 17, threaded to the bolt, constitute means moving together vertically when the nut is turned to compress the channel shaped elements 16 arranged in contacting, side-by-side relationship and normally held together as a unit by split wire rings 26a encircling grooved peripheral portions. Elements 16 may be very cheaply manufactured since they are stampings with cut out hole portions at the top and which have a high strength-to-weight ratio.

It should be noted that a solid ring 17a rests upon downwardly inclined surfaces formed in the top portion of elements 16 while another continuous ring 17b rests against upwardly inclined surfaces formed in the bottom portion of elements 16. Thus as the head 4 of the bolt is turned so as to move rings 17a and 17b toward each other and against the upper and lower inclined or cam surfaces of elements 16, elements 16 will be moved radially outwardly and will bite into the surface of the hole. By making the upper inclined surfaces less steep than the lower ones, for example, by inclining the upper surfaces 45° and the lower ones 60° or greater, the upper portions of elements 17 will move radially outwardly before the lower surfaces so as to insure freedom of upward movement of the lower nut and ring 17b while the upper edges of elements 16 are anchored in the hole surface. Of course, the inclined surfaces of elements 16 may be curved or cam-shaped instead of straight if desired.

Figure 9*b* is a further modification showing channel shaped segments similar to those shown in Figs. 9 and 9*a* with exception that a portion of the bolt shank 3 is flared outwardly at 3e to provide the wedging action with the lower end portions of the segments 16c. Furthermore, the lower ends of the punch pressed segments are flared outwardly at 16d to provide a biting engagement with the roof hole and thereby obtain better anchorage.

Figures 10*a*, 10*b* and 11 show a further modification of the expansion unit which is essentially in the form of a tubular can having an inner cylindrical wall 20 and an outer cylindrical wall 21. End walls may also be provided, if desired, against which nuts 6b and 7a are forced upon turning of the bolt head. The tubular cans are filled with small hard particles 22 of any desired shape, such as spherical, polygonal or irregular shape. For instance, steel particles may be used in the form of turnings, irregular shaped cubes and the like, such as are formed when castings or other metal parts are cleaned in rotating barrels or in otherwise shaping metal parts.

In operation, when the bolt head is turned and nuts 6b and 7a are moved toward each other forcing the ends of the can together, the particles are compacted or compressed, causing the outer wall of the can to bulge out from the position shown in Figure 9 to that shown in Figure 10, so as to firmly grip the hole wall. The more the bolt head is turned, the greater the bulging and anchorage by the particle filled can. The particles provide a wedging action among themselves which results in outward expansion in diameter of the can wall. The particles may be made of steel or other metals or hard substance and may be made of any suitable size. The can is not retrievable.

Figures 12, 13 and 14 show a still further modification which includes upper and lower split or continuous rings 23 and 24, respectively, which are moved toward each other by nuts 6 and 7 and which engage bevelled surfaces of a plurality of expansion units 25 circumferentially disposed about the shank of the bolt. Four such units are shown (see Figure 14), by way of example. Units 25 may be punch pressed parts which may be case hardened, or plated to give long life. They may be held together in assembled relationship by means of a wire 26 fitting in an outer groove. The outside surfaces of the wedge shaped units 25 may be grooved or serrated to increase frictional resistance with the hole wall.

In operation, as the nuts 6 and 7 are moved toward each other, split rings 23 and 24 are forced against the bevelled surfaces of expansion units 25 to effect a wedging action, resulting in radially outward movement of expansion units 25 and gripping thereof with the surface of the hole wall, so as to firmly anchor the bolt to the wall.

While the preceding description has been directed to a mine roof bolt, it will become readily apparent that the same constructions are useful for providing an anchor bolt in masonry construction, such as for the purpose of anchoring a bolt to a mass of concrete. An angle iron or other suitable plate (not shown) may be sandwiched between the bolt head and washer or between the washer and cementitious wall, if desired, as a means for enabling attachment to the anchor.

It will be further noted that by using a plurality of horizontally spaced units as shown a mine roof may be very greatly reinforced. Since the anchorage forces are radially outward, if the expansion units are at substantially the same height or level, the effect is to provide a supporting, continuous horizontal beam wherein the rock in the entire beam is under compression, which provides an amazing increase in strength of the mine roof and overcoming any tendency of roof fall.

It should be further noted that the present invention is not confined to use as an expansion bolt, but may be used in any application involving the radially outward expansion of one unit for gripping the cylindrical surface of a hole formed in an outer mass.

Figures 15 and 16, for example, show one such application, constituting a clutch which comprises a rotating drive shaft 28 and a driven concentric ring 29. On shaft 28 is telescoped a quill 30 surrounded by sets of split rings, 33 and 32, of different diameters. Collar 31 may be moved laterally by any suitable control element (not shown) such as a clutch lever. As collar 31 is moved to the left, rings 33 and 32 are compressed, causing the outer rings 33 to expand in diameter and grasp the inner surface of the cylindrical hole formed in ring 29 to effect clutching or driving engagement between drive shaft 28 and the driven element 29. An outstanding feature of the present clutch is that it is devoid of keyed parts and instead all parts are free to rotate.

The above structure may be also used as a brake if ring 29 were held stationary. Such brake could be operated oppositely to conventional methods in that the brake could be set by spring pressure. Hydraulic or air pressure will release the brake, so that if there is a fluid leak in the lines, the brakes will hold until the line is repaired.

The split rings shown in all the above described modifications may be normally held in assembled relationship either by means of a wire wrapped therearound or by merely using glue or similar adhesive which will hold the split rings together until expansive forces are applied.

Figure 4:
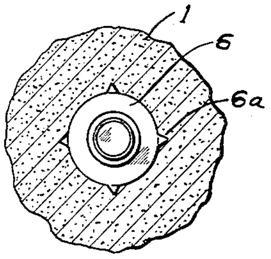
Figure 4 is a transverse cross-sectional view taken along line IV—IV of Figure 1.
Figure 5:
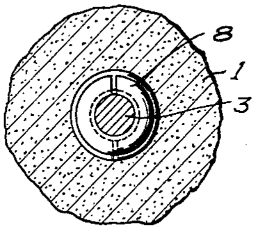
Figure 5 is a transverse cross-sectional view taken along line V—V of Figure 1.

Instead of using projections, such as 6a in Figure 4 to prevent rotation of the nut, a nut lock such as shown in Figures 17, 18 and 19 may be used.

Figs. 17, 18 and 19 show a still further modification of the invention wherein the bolt 3 is provided with integral projections 3*a* which act as supports for a washer 37 which, in turn, supports frusto-conical collapsible washer 38. A washer 39 rests on washer 38 and supports the split ring assembly comprising three cylinders of split rings 40, 41 and 42. The central row 41 is shown as having rings of medium diameter. Supported on the split rings is a washer 43 on which a square nut 44 bears.

Supported on nut 44 is a novel type one-piece lock washer 45 which is centrally perforated for projection therethrough of the threaded portion 3 of the bolt, and which has a pair of downwardly extending ears or lugs **45*a* which closely hug the flat sides of the square nut 44 and has outwardly extending flanges 45*b* for engaging the interior surface of the hole 2. Lock washer 45 has also upstanding ears or lugs 45*c* together with outwardly extending flanges 45*d* for engaging the inner surface of the hole 2**.

The bottom end of bolt 3 is preferably provided with an integral head, such as 4, on which is supported a bearing plate or washer like member 5, as shown in Figs. 1 and 2.

In operation, as the bolt head 4 is turned, nut 44 will not turn because of the restraining action provided by the anchoring of ears **45*d* and 45*b* in the inner surface 2 of the hole. Therefore, as the bolt 3 is turned, washers 39 and 43 are moved toward each other, thereby compressing the groups of split rings and causing outward expansion of rings 42 and frictional engagement thereof with surface 2. After such engagement, further turning of the bolt will cause washers 39 and 37 to move toward each other and compress the intermediate frusto-conical washer 38 until it gradually collapses at a pressure of about 9000 lbs. per square inch or other suitable high pressure. Previous to the collapse of washer 38, bolt head 4 has not contacted washer 5, or perhaps has contacted it with very light force, insufficient to compress the strata of the roof. The purpose of providing washer 38 or some other yieldable element which yields under very high pressure, such as perhaps a Belleville washer, is to insure that sufficient expansion and anchoring force is provided by the split rings 42 against the inner surface of hole 2 before washer 5 commences to apply compressive forces to the roof strata 1. In short, collapsible washer 38 provides a take-up for the bolt. Washer 43 can be omitted and lock washer 45 substituted therefor but placed underneath instead of on top of the nut 44, in which case the downwardly extending portions 45*a* and 45*b* would be eliminated. If desired, instead of providing an integral bolt head 4, a separate nut may be substituted and threaded to a bottom threaded portion of the bolt 3, in which case the shank of the bolt first will be turned by a suitable tool to effect expansion of split rings 42 so as to tightly engage the inner wall surface of hole 2** before the nut is screwed to compress the roof strata.

Figs. 20 and 21 show a still further modification wherein the lower parts 3, **3*a*, 37, 38, 39 split-ring assembly 40, 41 and 42, and nut 44 are the same as shown in Fig. 17 but wherein a modified type of nut lock 48 is used comprising a coil 48*a* of strong wire of large diameter having downwardly extending end portions 48*b* the extremities of which engage the inner surface of the hole 2 and at the same time the end portions 48*b* act as nut lock elements to prevent turning 44 as bolt 3** is turned.

It should be noted that a plurality of mine roof bolts of the construction shown in Figs. 17–18–19 or Figs. 20–21 or in any of the previous figures, such as Fig. 8, may be used so that the expanding and anchoring split rings 42 engage the same layer or stratum so as to place the entire stratum under compression and make it act as a strong supporting beam. Thus, after the washers 5 of the various bolts are forced against the lower surface of the mine roof the various layers or strata between the washers and the stratum, in which the split rings 42 are anchored, will be placed under compression and thereby strengthened as well as supported by the layer compressed by the split rings, thereby insuring against roof cave-ins. Of course, more than one split ring assembly can be used on each bolt, such as two, as shown in Fig. 8, or a greater number, so as to place several layers or strata under compression, instead of one, and provide a plurality of supporting beams for the underlying strata which are compressed by tightening of the bolt head 4 or nut. Or perhaps the various vertically spaced split ring assemblies on the same bolt may become anchored to vertically spaced portions of the same layer or stratum, particularly in the case of a substantially thick and dense one.

However, in some cases it is desired to anchor to different strata. For instance, a central bolt of greatest length may be turned so as to anchor onto a high stratum of rock, and the next bolts, parallel or perhaps at an angle thereto, but of shorter length, may be turned so as to anchor to a lower stratum or layer, and perhaps the bolts farthermost may be even shorter to anchor onto a still lower layer. Thus a keystone effect is produced. Or perhaps instead of arranging the various split rings of the various bolts in the same horizontal plane, they may be arranged along an upwardly bowed plane, particularly if the rock strata is so shaped or permits such curvature, so that even in case of partial cave-in, the curve would tend to straighten out slightly rather than to completely collapse as might occur in case of cave in of a flat horizontal beam.

Furthermore, while in most instances when multiple, vertically spaced split-ring assemblies are used, such as shown in Fig. 8, it is desirable that they all expand and anchor simultaneously, it may nevertheless be desirable, in certain applications, to provide for successive anchorage instead. This can be obtained either by putting collapsible elements of different collapsing strength, one on the bottom of each split ring assembly or perhaps by putting different numbers of the same type of collapsible washer 38 in stacked relationship with each vertically spaced assembly whereby it will be possible, for example, to anchor first to one stratum, then to others, in succession, either above or below the first stratum.

It should be further noted that when a series of horizontally spaced mine roof bolts are used to firmly hold together the layers of a mine roof, uniform anchoring pressure in the respective, vertical, parallel holes may be obtained by not using integral bolt heads, such as 4, but by using, instead, screw threaded nuts engageable on a threaded lower end portion of the bolt shank. The various shanks may be turned, in succession, until the expansion bolts are tightly anchored, and thereafter the nuts may be applied and forced against either separate or integral washers, such as 5, or plates so as to compress the various layers or strata of rock and thus provide, in effect, not only a rigid horizontal supporting beam in the form of a horizontal layer of rock under pressure, but a plurality of depending, vertical, parallel beams which provide vertical beams of rock under pressure, simulating a plurality of vertical hangers for insuring that the layers of rock are firmly bound together to form, in effect, a single laminated horizontal beam of amazing strength which will substantially eliminate the possibility of roof cave-ins.

Thus it will be seen that I have provided an efficient expansion unit suitable for various applications, particularly as an expansion bolt or mine roof bolt, and involving a novel principle of expansible split rings of slightly different diameter so as to effect wedging action causing expansion of the outer rings against a hole wall, and contraction of the inner rings against the bolt shank, so as to provide tight anchorage along a multiplicity of points on the hole wall as well as on the bolt shank, to insure against turning of the bolt and to insure exertion of radially outward forces along the length of the bolt, furthermore I have provided split rings which are individual and independent of each other to the extent that they may be embedded in different depths of the roof hole to compensate for soft spots such as shale or earth layers sandwiched between rock layers without impairing the strength of the anchor.

While I have illustrated and described certain specific embodiments of my invention, it will be understood that these are by way of illustration only, and that various changes and modifications may be made within the contemplation of my invention and within the scope of the following claims.

I claim:

1. An expansion device comprising a bolt having a threaded shank portion, a pair of longitudinally spaced stop elements surrounding the shank of said bolt, at least one of which is screw-threadedly engaged to said shank portion, a plurality of separate, coaxial, stacked split rings of circular cross-section and of spring metal surrounding said shank intermediate said stop elements, alternate split rings being of a diameter smaller than that of a hole in a wall in which said device is to be expanded, said alternate rings alternating with other split rings of still smaller diameter and contacting them in substantially circular paths, a washer surrounding said shank and adapted to rest against the head of said bolt and to engage the surface of the wall into which said hole is formed, means for holding said nut against rotation with respect to said hole surface as a consequence of turning of said bolt, whereby all of said split rings are compressed between said stop elements as they move toward each other, thereby expanding the diameters of said alternate split rings so as to engage the surface of said hole, and contracting the diameters of said other split rings.

2. An expansion bolt as recited in claim 1 wherein said means comprises a lock nut washer having portions extending along the faces of said nut to prevent turning thereof.

3. An expansion bolt as recited in claim 1 together with a frusto-conical washer supported on said shank for supporting one of said stop elements, whereby the washer will collapse as a consequence of predetermined turning of said bolt to insure sufficient outward expansion of the split rings of larger diameter before collapse of the frusto-conical washer.

References Cited in the file of this patent

UNITED STATES PATENTS

| | | |
|---|---|---|
| 768,283 | Jenkins | Aug. 23, 1904 |
| 1,120,411 | Rohmer | Dec. 8, 1914 |
| 1,136,638 | Zifferer | Apr. 20, 1915 |
| 1,352,201 | Kennedy | Sept. 7, 1920 |
| 2,147,357 | Scholtes | Feb. 14, 1939 |